J. E. PATTERSON.
FALSE BOTTOM FOR COOKING UTENSILS.
APPLICATION FILED JUNE 4, 1921.

1,434,262. Patented Oct. 31, 192

JOHN E. PATTERSON
INVENTOR

BY Victor J. Evans
ATTORNEY

Patented Oct. 31, 1922.

1,434,262

UNITED STATES PATENT OFFICE.

JOHN E. PATTERSON, OF CHICAGO, ILLINOIS.

FALSE BOTTOM FOR COOKING UTENSILS.

Application filed June 4, 1921. Serial No. 474,902.

*To all whom it may concern:*

Be it known that I, JOHN E. PATTERSON, a citizen of the United States, residing at Chicago, in the county of Cook and State of Illinois, have invented new and useful Improvements in False Bottoms for Cooking Utensils, of which the following is a specification.

This invention relates to culinary utensils and more particularly to a false bottom for use in pots, kettles or the like for preventing the burning of the edibles being cooked.

Another object of this invention is to provide a false bottom as specified which is simple in construction, efficient, and one which can be constructed at a relatively low cost, as well as one which embodies features to prevent its falling out of the utensil in which it is mounted when the latter is tilted to pour water or the contents of the utensil therefrom.

Other objects of the invention will appear in the following detailed description and in the accompanying drawings wherein.

Figure 1:
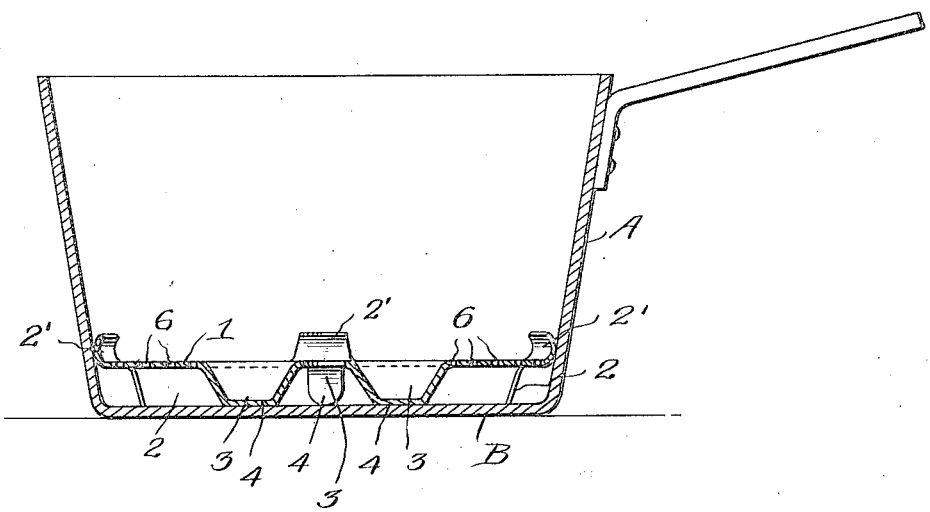
Fig. 1 is a section through a kettle showing the improved false bottom mounted therein.

Referring more particularly to the drawings, the improved false bottom for cooking utensils is formed of sheet metal and is constructed so that it may be cut or stamped and formed by a minimum number of mechanical operations and which comprises a main body 1 preferably disc like. The edge of the body 1, is cut to provide a plurality of ears or portions 2 and 2', the former of which are bent downwardly to provide supporting legs for engagement with the bottom of a kettle or utensil A, while the ears 2' are rolled upwardly and engage the inner surface of the sides of the kettle A. The false bottom is preferably formed of sheet metal which has sufficient resiliency to cause frictional engagement of the ears 2' with the inner walls of the utensil A in which it is mounted. A plurality of supporting legs 3 are forced from the disc body 1 in a circle concentric of the center of the disc as clearly shown in Figure 1 of the drawings, and the legs are substantially pyramidal shaped having their apices 4 adapted to rest upon the inner surface of the bottom B of the utensil A and support the false bottom 1 in spaced relation to the bottom B of the utensil to prevent contact with the bottom of the utensil of edibles being cooked therein.

The body 1 of the false bottom is provided with a plurality of openings 6 which are adapted to permit the passage of water or liquid through the false bottom, and it is to be understood that these openings may be any size or shape desired and also that any number of them may be provided without departing from the spirit of this invention.

Figure 3:
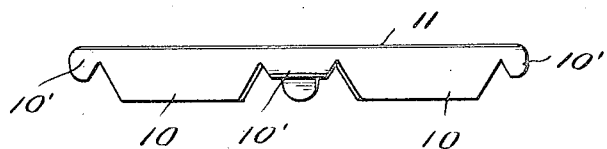
Fig. 3 is a side elevation of a modified form of the false bottom.
Figure 2:
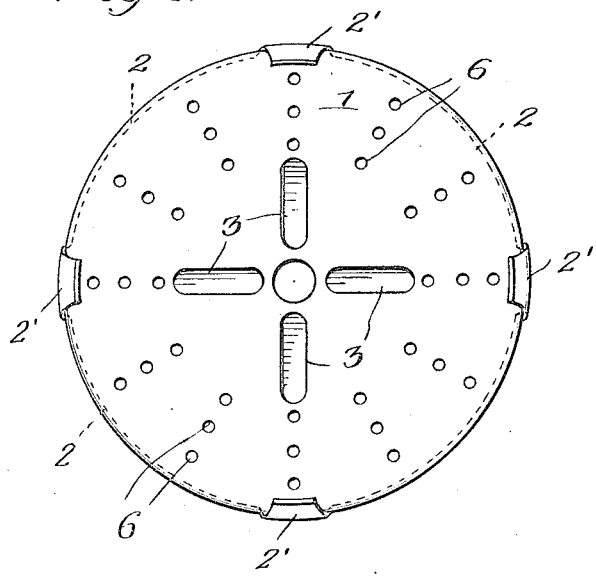
Fig. 2 is a top plan of the improved false bottom.

In Figure 3 of the drawings, a modified form of the false bottom is shown, in which the ears 10' that are analogous to the ears 2' are down turned from the body 11, extending in the same direction as the supporting ears 10, in all other respects this modified form is similar to the preferred form illustrated in Figures 1 and 2 of the drawings. As clearly shown in the drawings, the ears 2' are much shorter as well as narrower than the ears 10 so as to provide a relatively great resiliency in the ears 2' and 10' that cause frictional engagement with the inner surface of a kettle or other cooking utensil.

It is, of course, to be understood that the invention may be constructed in various other manners and the parts associated in different relations and, therefore, I do not desire to be limited in any manner except as set forth in the claims hereunto appended.

Having thus described my invention what I claim is:

1. As a new article of manufacture, a false bottom for cooking utensils formed of a single sheet of metal, and having its edge portion transversely rolled, said transversely rolled edge portion being cut to provide a plurality of ears, certain of said ears extending in one direction from the false bottom, and others extending in the opposite direction.

2. As a new article of manufacture, a false bottom for cooking utensils comprising a perforated body, supporting legs struck therefrom, and resilient means about the perimeter of said body for frictionally engaging the inner surface of the sides of the cooking utensil.

3. As a new article of manufacture, a false bottom with a hole in the center and stamped to have upstanding resilient ears and depending resilient ears and depending legs arranged to rest upon the bottom of a cooking utensil with the said upper ears and lower depending ears in frictional engagement with the side of the cooking utensil.

In testimony whereof I affix my signature.

JOHN E. PATTERSON.